US005772279A

United States Patent [19]
Johnson, Jr.

[11] Patent Number: 5,772,279
[45] Date of Patent: Jun. 30, 1998

[54] COUPLING SYSTEM FOR INFANT CARRIER TO SECOND SUPPORT DEVICE

[75] Inventor: Edward M. Johnson, Jr., Park Forest, Ill.

[73] Assignee: Kolcraft Enterprises, Inc., Chicago, Ill.

[21] Appl. No.: 863,135

[22] Filed: May 27, 1997

Related U.S. Application Data

[63] Continuation of Ser. No. 522,135, Aug. 31, 1995, abandoned.

[51] Int. Cl.[6] .................................................. A47C 13/00
[52] U.S. Cl. .............. 297/130; 297/256.16; 297/440.16; 280/30
[58] Field of Search ............................. 297/130, 256.16, 297/440.16; 280/30, 647, 648, 650, 657, 33.993, 658, 47.38

[56] References Cited

U.S. PATENT DOCUMENTS

| | | | |
|---|---|---|---|
| 4,065,177 | 12/1977 | Hyde et al. | 297/327 |
| 4,186,961 | 2/1980 | Farrell, Jr. et al. | 297/216 |
| 4,306,749 | 12/1981 | Deloustal | 297/440 |
| 4,345,791 | 8/1982 | Bryans et al. | 297/250 |
| 4,440,331 | 4/1984 | Schimmels | 224/31 |
| 4,537,414 | 8/1985 | Nusbaum | 280/47.41 |
| 4,555,121 | 11/1985 | Lockard et al. | 280/30 |
| 4,570,956 | 2/1986 | Dyer | 280/30 |
| 4,615,560 | 10/1986 | Schaller | 297/130 |
| 4,632,456 | 12/1986 | Kassai | 297/328 |
| 4,634,177 | 1/1987 | Meeker | 297/250 |
| 4,641,844 | 2/1987 | Mar et al. | 280/30 |
| 4,679,804 | 7/1987 | Johnson | 280/30 |
| 4,681,368 | 7/1987 | Heath et al. | 297/250 |
| 4,685,688 | 8/1987 | Edwards | 280/30 |
| 4,743,063 | 5/1988 | Foster, Jr. | 297/130 |
| 4,744,599 | 5/1988 | Jankowski et al. | 297/250 |
| 4,750,783 | 6/1988 | Irby et al. | 297/250 |
| 4,754,999 | 7/1988 | Kain | 297/250 |
| 4,762,331 | 8/1988 | Tucker et al. | 280/30 |
| 4,762,364 | 8/1988 | Young | 297/250 |
| 4,768,795 | 9/1988 | Mar | 280/30 |
| 4,786,064 | 11/1988 | Baghdasarian | 280/30 |
| 4,826,246 | 5/1989 | Meeker | 257/250 |
| 4,828,281 | 5/1989 | Sanchas | 280/30 |
| 4,834,403 | 5/1989 | Yanus et al. | 280/30 |
| 4,861,105 | 8/1989 | Merten et al. | 297/250 |
| 4,874,182 | 10/1989 | Clark | 280/30 |
| 4,878,680 | 11/1989 | Molnar | 280/30 |
| 4,896,894 | 1/1990 | Singletary | 280/30 |
| 4,903,980 | 2/1990 | Schwartz | 280/647 |
| 4,915,446 | 4/1990 | Darling et al. | 297/250 |
| 4,921,261 | 5/1990 | Sadler, Jr. et al. | 280/30 |
| 4,943,113 | 7/1990 | Meeker | 297/250 |
| 4,984,813 | 1/1991 | Takahashi et al. | 280/30 |
| 4,989,888 | 2/1991 | Qureshi et al. | 280/30 |
| 5,022,669 | 6/1991 | Johnson | 280/30 |
| 5,052,750 | 10/1991 | Takahashi et al. | 297/250 |
| 5,104,134 | 4/1992 | Cone | 280/30 |
| 5,106,154 | 4/1992 | Kain | 297/250 |
| 5,121,940 | 6/1992 | March | 280/644 |
| 5,133,567 | 7/1992 | Owens | 280/30 |
| 5,149,113 | 9/1992 | Alldredge | 280/30 |
| 5,188,380 | 2/1993 | Tucek | 280/30 |
| 5,201,535 | 4/1993 | Kato et al. | 280/30 |
| 5,203,577 | 4/1993 | Kato et al. | 280/30 |
| 5,224,720 | 7/1993 | Chaw et al. | 280/62 |
| 5,230,523 | 7/1993 | Wilhelm | 280/30 |
| 5,234,224 | 8/1993 | Kim | 280/30 |
| 5,499,831 | 3/1996 | Worth et al. | 280/30 |

FOREIGN PATENT DOCUMENTS

| | | | |
|---|---|---|---|
| 2193692 | 2/1988 | United Kingdom | 280/30 |
| 2254587 | 10/1992 | United Kingdom | 280/30 |
| 2262914 | 7/1993 | United Kingdom | 280/30 |

*Primary Examiner*—Laurie K. Cranmer
*Attorney, Agent, or Firm*—Marshall, O'Toole, Gerstein, Murray & Borun

[57] ABSTRACT

A system for coupling an infant carrier to a second support device in which the infant carrier has coupling members extending from the side of the carrier, the coupling members forming mounting pockets. The support device, such as an infant car seat base or stroller, employs coupling posts adapted to be received within the carrier mounting pocket.

13 Claims, 8 Drawing Sheets

FIG. 4

COUPLING SYSTEM FOR INFANT CARRIER TO SECOND SUPPORT DEVICE

This is a Continuation of U.S. application Ser. No. 08/522,135, filed Aug. 31, 1995, now abandoned.

BACKGROUND OF THE INVENTION

The invention disclosed and claimed herein relates generally to apparatus and a system for coupling an infant carrier device to a second support device disposed below the infant carrier, and, more particularly, the invention relates to securing an infant carrier to an infant car seat base, stroller or the like.

DESCRIPTION OF THE PRIOR ART

There are presently available in the art various systems for coupling an infant seat carrier to a base or another device such as a stroller. One example is disclosed in U.S. Pat. No. 4,943,113 which discloses an infant carrier disposed on a carrier base by means of a three-point triangular coupling arrangement. The system utilizes a pair of spaced pivotable fingers extending upward adjacent the sides of the base and a J-hook connection located at the front end of the carrier. It has been viewed that this system is not entirely satisfactory inasmuch as the finger couplings are not readily visible by a viewer. Moreover, the coupling system utilizes what is deemed to be an excessive number of parts.

Further, it is desired to have a relatively simple system for readily coupling an infant carrier not only to a car seat base, but to other support devices as well, such as an infant stroller or infant glider.

What is desired is to have a coupling system which is easily viewable by an individual while an individual is coupling an infant seat to a car seat base, infant stroller or other device. Moreover, it is desired the coupling device be relatively easy to operate and utilize as few a number of parts as possible.

SUMMARY OF THE INVENTION

The invention disclosed and claimed herein serves to obviate the problems associated with the prior art while at the same time achieving the desired features for coupling an infant carrier to a second support device.

Briefly, the coupling system utilized with the present invention utilizes an infant seat which has a coupling socket or pocket which extends outward from each side of the infant seat. Each pocket is adapted to receive a readily viewable seating post which extends upward from an infant car seat base, stroller or other support device. The infant seat can relatively easily and readily be seated on the coupling posts.

It is preferred that, at least with a car seat base, a pair of fingers, which are located along the longitudinal axis of the carrier base, be employed to further assist in the coupling system. When an infant carrier is seated, for example, on an infant stroller, however, the fingers need not be utilized.

BRIEF DESCRIPTION OF THE DRAWINGS

FIG. 4 shows a side section view of the infant carrier base and carrier assembly taken along line 4—4 in FIG. 3 with the bottom portion of the infant carrier broken away and shown in section;

DETAILED DESCRIPTION OF THE DRAWINGS

Figure 1:
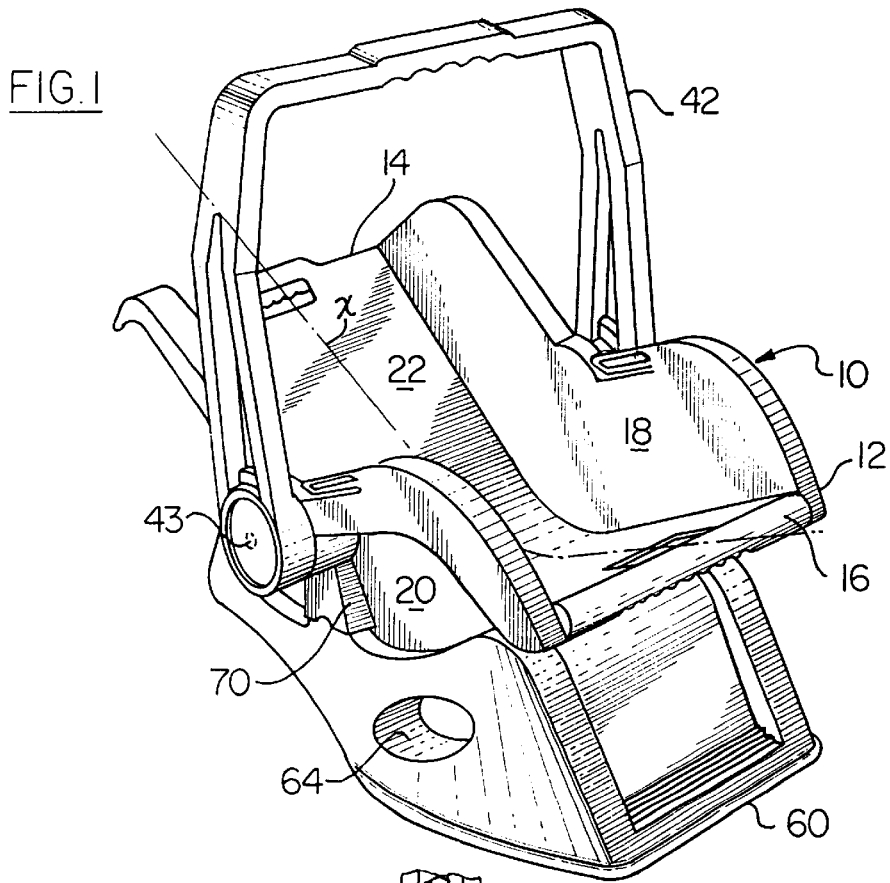
FIG. 1 shows the infant carrier of the present invention coupled to an infant carrier base.
Figure 6:
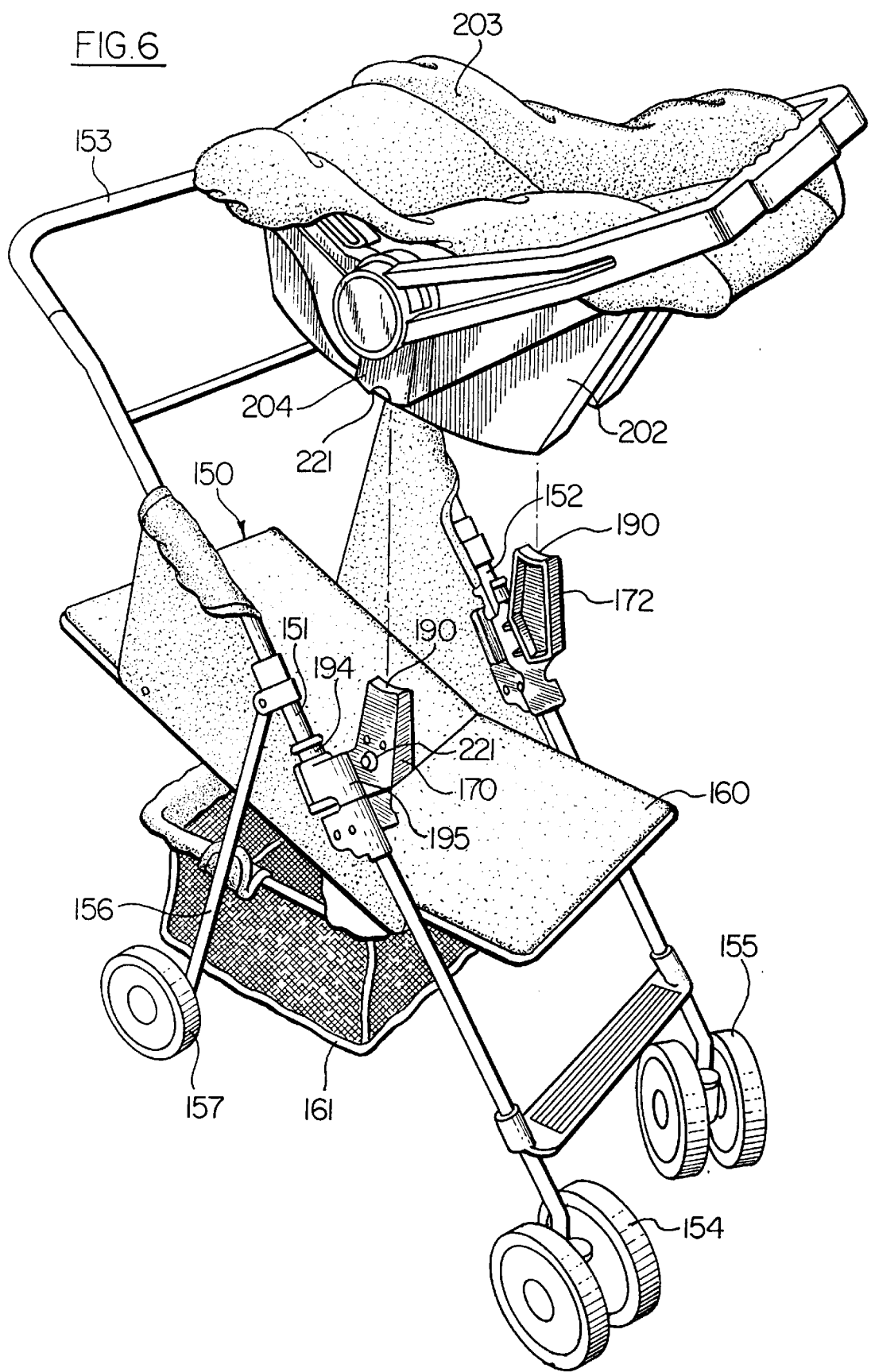
FIG. 6 shows the infant carrier of the present invention spaced above an infant stroller.

Referring to the drawings and more particularly to FIG. 1, carrier 10 is a conventional carrier for an infant. Carrier 10 often is referred to in the art as an infant car seat. It is to be understood that carrier 10, as disclosed and claimed herein, can be utilized and referred to, if desired, as an infant car seat. Carrier 10 includes shell 12 extending from head end 14 to foot end 16 and normally is of a length which is substantially greater than its width. Sides 18, 20 extend upwardly from the side edges of central portion 22 and serve to restrain an infant from excessive lateral movement. Shell 12 is contoured along its length in a serpentine manner to provide for greater infant comfort. Generally, a soft cloth pad, such as illustrated in FIG. 6, is disposed within the shell and an infant is placed upon the pad. A plurality of buckles and belts normally are employed to further restrain an infant in the carrier.

Carrier 10 preferably is fabricated or otherwise molded from a rigid, impact resistant, high polymer plastic such as polyethylene, polyvinyl chloride or the like.

Figure 5:
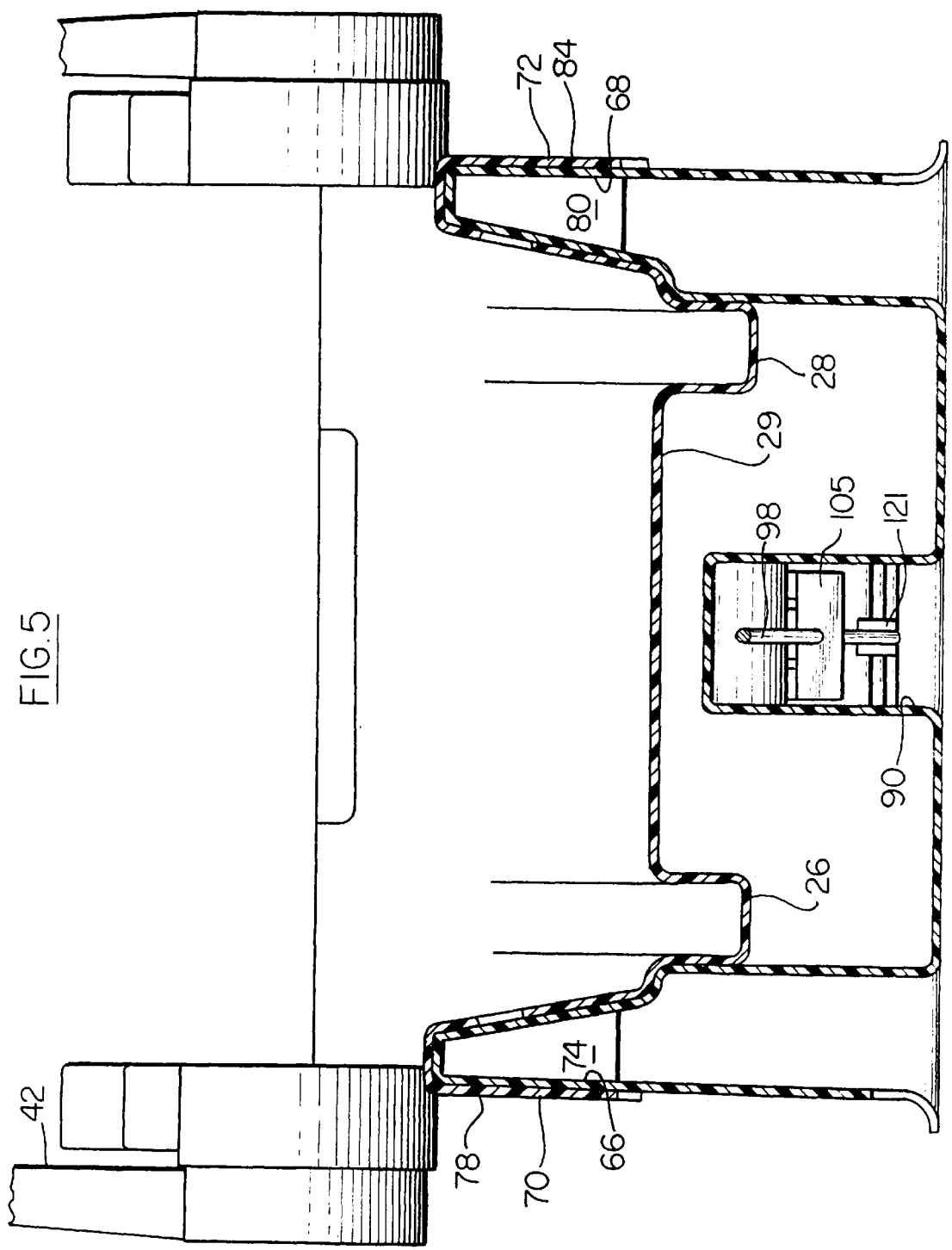
FIG. 5 shows a cross-section elevated view taken substantially long line 5—5 in FIG. 4.

The lower portion of carrier 10 includes rocker legs 26, 28 (FIG. 5) which extend outward from lower carrier face 29. Each leg is located adjacent to a carrier side extending generally centrally along a portion of the length of the carrier.

Extending outward from lower carrier face 29 are latch members 30, 31 which are spaced from one another along the longitudinal axis "X" of carrier 10 (FIG. 1). Latch member 30 is disposed on the face of carrier 12 contiguous to foot end 16. Latch member 30 includes a stamped, bent metal member having one end portion 33 which extends through an opening in the carrier and is riveted or bolted at 34 to upper carrier face 29'. A second end portion 35 includes opening 37. Second latch member 31 comprises a stamped, bent metal member having an end portion 38 which extends through an opening in the carrier and is riveted or bolted at 39 to upper carrier face 29'. Second end portion 40 has an opening 41.

Carrier 10 also includes a handle 42 which is illustrated in an inverted U-shaped configuration. The handle is coupled to the carrier by pins 43 which extend through the sides of the carrier near the central portion of its length.

Infant carrier base 50, which can be molded from the same material as the carrier, includes a central portion 52 which is adapted to receive the central portion 22 of carrier 10. Upstanding side walls 54, 56 are molded to the sides of portion 52. The length of the base from head end 58 to foot end 60 is substantially equal to that of the mating surface of the carrier, save at the head end, where base 50 is somewhat shorter in length than the corresponding portion of carrier 10. Like the carrier, the molded base is curved in a serpentine fashion to mate with the curves of carrier 10. Base foot end 60 is located almost substantially beneath carrier foot end 16 for contact with a car seat to which the assembly is adapted to be secured via a seat belt which extends through holes 64 in base 50.

Figure 2:
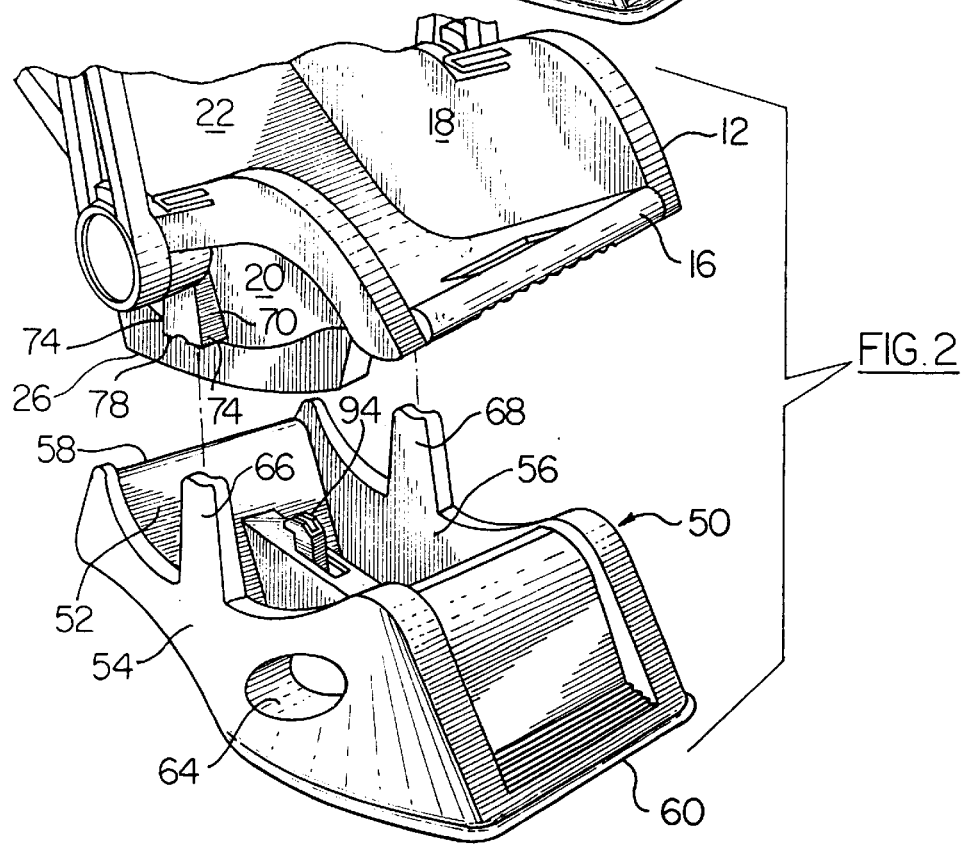
FIG. 2 shows the infant carrier of FIG. 1 spaced above the infant carrier base with the carrier pockets positioned above corresponding base coupling posts.
Figure 3:
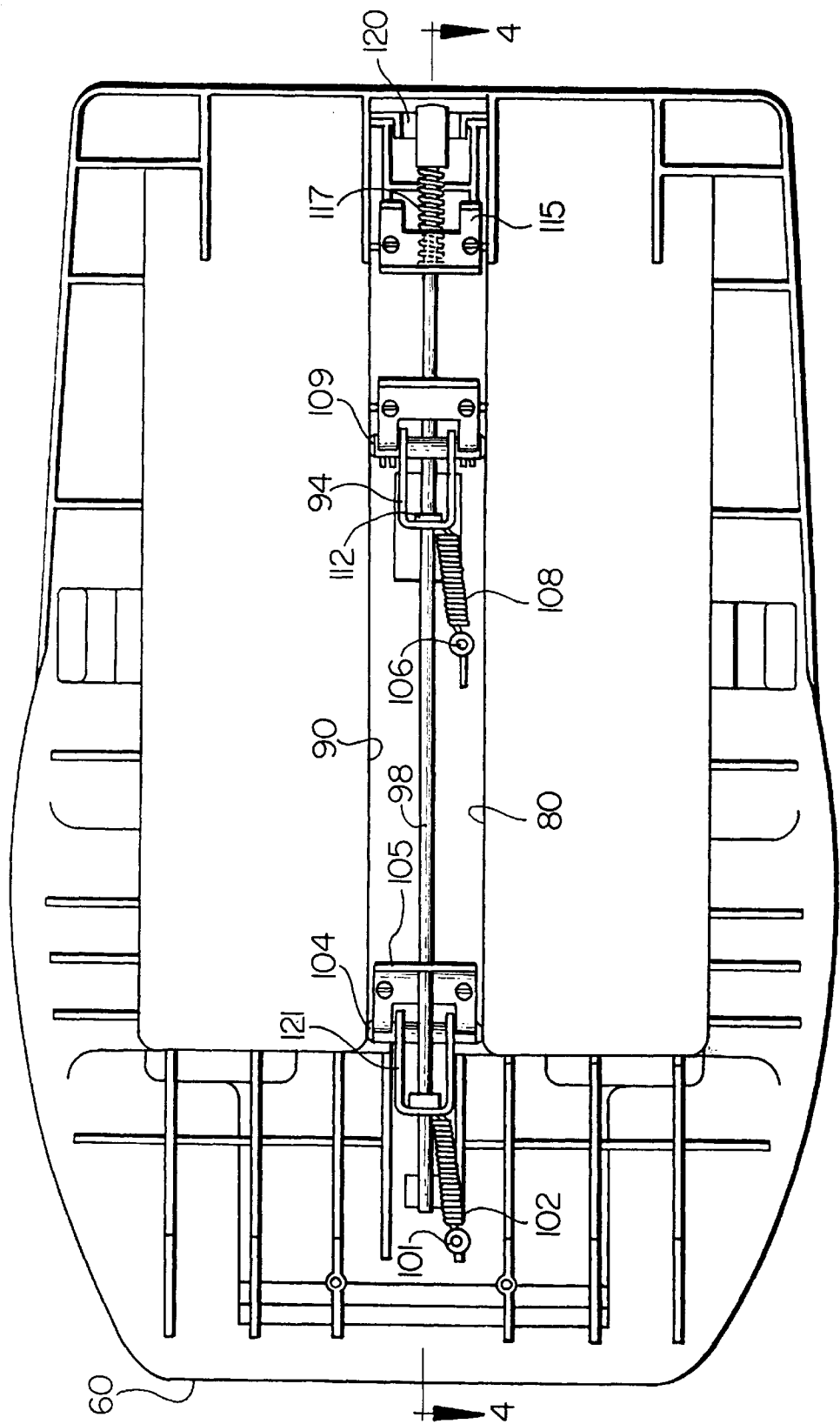
FIG. 3 shows a bottom view of the infant carrier base of FIG 1.

Coupling of carrier 10 to infant carrier base 50 is effected initially by a plurality of spaced base mounting posts 66, 68 and corresponding coupling members comprising carrier pockets 70, 72. Referring to FIG. 2, mounting post 66 is integrally molded as part of base side wall 54. Post 66 extends vertically upward and is tapered inwardly as the post extends outwardly from side wall 56. An identical mounting post 68 is molded integrally with base side wall 56, posts 66, 68 being identical in structure. The posts each have a length substantially greater than its thickness and its width.

Referring to carrier 10, it will be seen that coupling members having mounting pockets 70, 72 are formed on the outer surfaces of carrier sides 18, 20. Specifically, pocket 70 is formed by a U-shaped member comprising side member 74 and base 78. Pocket 72 also is formed by a U-shaped member which is integrally molded with and extends laterally outward from side 18, the U-shaped member including side members 80 and base 84.

While one particular preferred configuration has been illustrated as serving as a carrier mounting pocket and base post, it is appreciated that other structures could be utilized by a person of skill in the art. What is desired is that the coupling base and pocket be of a sufficient size that they are readily viewable to a person intending to deposit infant carrier 10 on base 50. One need only align the carrier mounting pockets 70, 72 over base mounting posts 66, 68, FIG. 2, whereby the posts are relatively readily and easily received in the mounting pockets or sockets and carrier 10 seats on base 50 without substantial movement of carrier 10 relative to base 50 in either a lateral or longitudinal direction. As shown in FIG. 2, the posts taper inwardly moving away from a base side wall. The pocket formed in the carrier coupling member also is tapered whereby a base post seats snugly within a carrier coupling pocket.

If desired, a further coupling system can be employed along with the carrier/base coupling arrangement shown and described with respect to FIG. 1. Referring to FIGS. 2–5, the lower surface of base 50 has a recess 90 (FIG. 3) which extends substantially along the longitudinal axis of base 50. Within the recess are disposed a pair of longitudinally aligned, U-shaped locking fingers 94, 96. A locking lever 98 is disposed in the recess and is pivotally connected to spaced fingers 94, 96.

A web 100 includes a suitable extension member 101 to which is attached one end of compression spring 102. The remaining end of spring 102 fastens to the bottom of finger 96.

A mounting bracket 103 is fastened to a base web and includes a pivot 104 which extends through an opening 105 in finger 96.

A second web 106 has a mounting extension 107 to which is fastened in any suitable manner one end of compression spring 108. The remaining end of spring 108 is fastened to the lower end of finger 94. A pivot member 109 is mounted on a second mounting bracket, not shown, in a manner similar to the first mounting bracket 103, the second mounting bracket also being attached to a web member on base 50. Pivot 109 extends through an opening 110 in finger 94. A pin or washer 112 is fastened to lever 98 and is positioned adjacent to the base 113 of finger 94.

A third mounting bracket 115 is fastened to an extension 116 joined to base 50. Lever rod 98 extends through an opening in bracket 115. Compression spring 117 is disposed over rod 98 and positioned between mounting bracket 115 and lever rod button 120.

At the end of rod 98 furthest from button 120, a U-shaped link member 121 has the open ends of the member fastened to the lever rod while the base end of the U-shaped member extends through the side walls of U-shaped finger 96.

When coupling carrier 10 to base 50, carrier 10 is disposed on base 50 with mounting pockets 70, 72 adapted to seat on posts 66, 68. As the carrier is moved toward the base, latch member 30 contacts pivotable finger 96 while latch member 31 contacts pivotable finger 94 whereby both fingers are urged away from their normal position to a position, as shown in dotted lines in FIG. 4, which is in the direction of base end 60. When fingers 94, 96 reach the latch openings 37, 41, the fingers will be urged in the direction of base end 58 whereby fingers 94, 96 will enter the openings and, in conjunction with the primary coupling posts 66, 68 and pockets 70, 72, serve to lock carrier 10 to base 50.

When it is desired to remove carrier 10 from base 50, button 120 is urged in the direction of arrow "AA" which in turn moves lever rod 98 in the direction of arrow "B". As rod 98 moves toward base end 60, washer member 112 urges finger 94 out of latch opening 41 as finger 94 pivots about pivot member 109. Simultaneously, as link 121 is pulled toward base end 60, it serves to withdraw finger 96 from latch opening 37 as finger 96 pivots about pivot 104. When fingers 94, 96 are disengaged from latch openings 37, 41, carrier 10 can be lifted off posts 66, 68 to remove carrier 10 from base 50.

Figure 4:
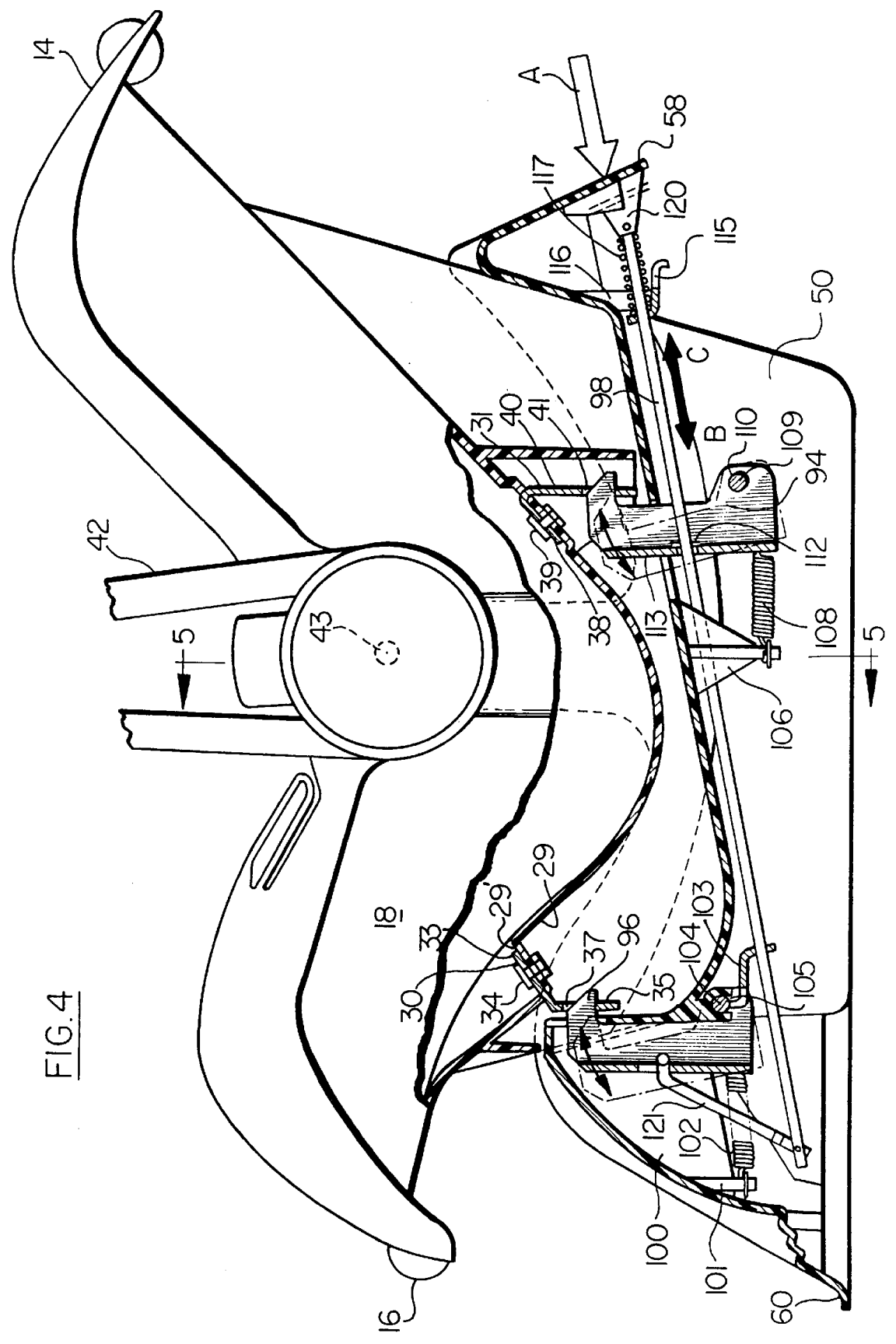

Upon release of button 120, lever rod 98 is urged by spring 117 in the direction of arrow "C" and fingers 94, 96 are returned to their normal position as illustrated in solid lines in FIG. 4.

FIGS. 1–5 illustrate carrier 10 disposed upon infant car seat base 50. If desired, carrier 10 can be disposed on other support devices, as, for example, an infant stroller or infant glider. Referring, for example, to FIGS. 6–9, inclusive, stroller 150 is a conventional stroller device and comprises frame members 151, 152 which are connected together at one end by handle bar 153. Wheels 154, 155 extend from the remaining open ends of members 151, 152. A second pair of frame members 156 extend from members 151, 152 and a second pair of wheels 158, only one of which is shown, is connected to the outboard end of the second pair of frame members. A conventional infant seat 160 and basket 161 are mounted to the respective frame members.

A first mounting post adaptor 170 is releasably mounted to frame member 151 and a second mounting post adaptor 172 is releasably mounted to frame member 152. Each adaptor is essentially of the same construction, preferably being molded from the same plastic material as the carrier. The molded adaptor provides the desired rigidity for the mounting posts while at the same time allows the adaptor to have a sufficient resiliency to permit it to be released from a stroller frame member.

Figure 9:
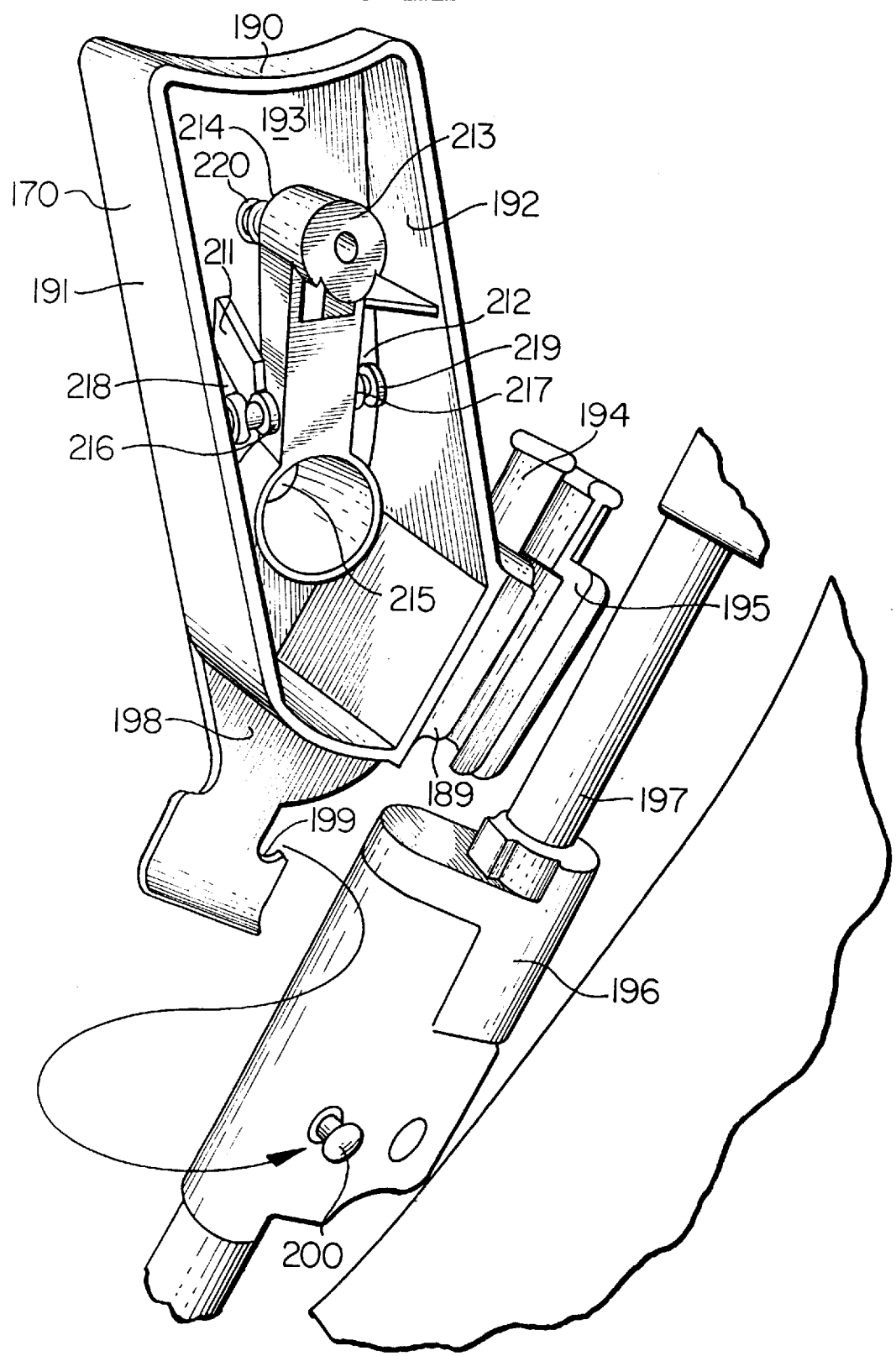

Adaptor 170, as seen in FIG. 9, is a one-piece molded U-shaped member which includes mounting post 190. Post 190 comprises sides 191, 192 and base 193. An adaptor portion 189 extends from post 190 and includes a slotted circular portion 194 and a slotted frame portion 195. Portions 194, 195 are sized and configured to slide over a corresponding stroller frame section 196 and snap on to tubular frame section 197. Web 198 depends from post 170 and includes a notch 199 which is adapted to engage a locking button 200 on stroller frame member 151.

Adaptor 172 is sized and configured in the same manner as adaptor 170 and is the mirror image of adaptor 170.

Carrier 202, having an insulating pad 203 disposed in the carrier shell, employs the same construction described previously with respect to carrier 10 in FIG. 1.

Figure 7:
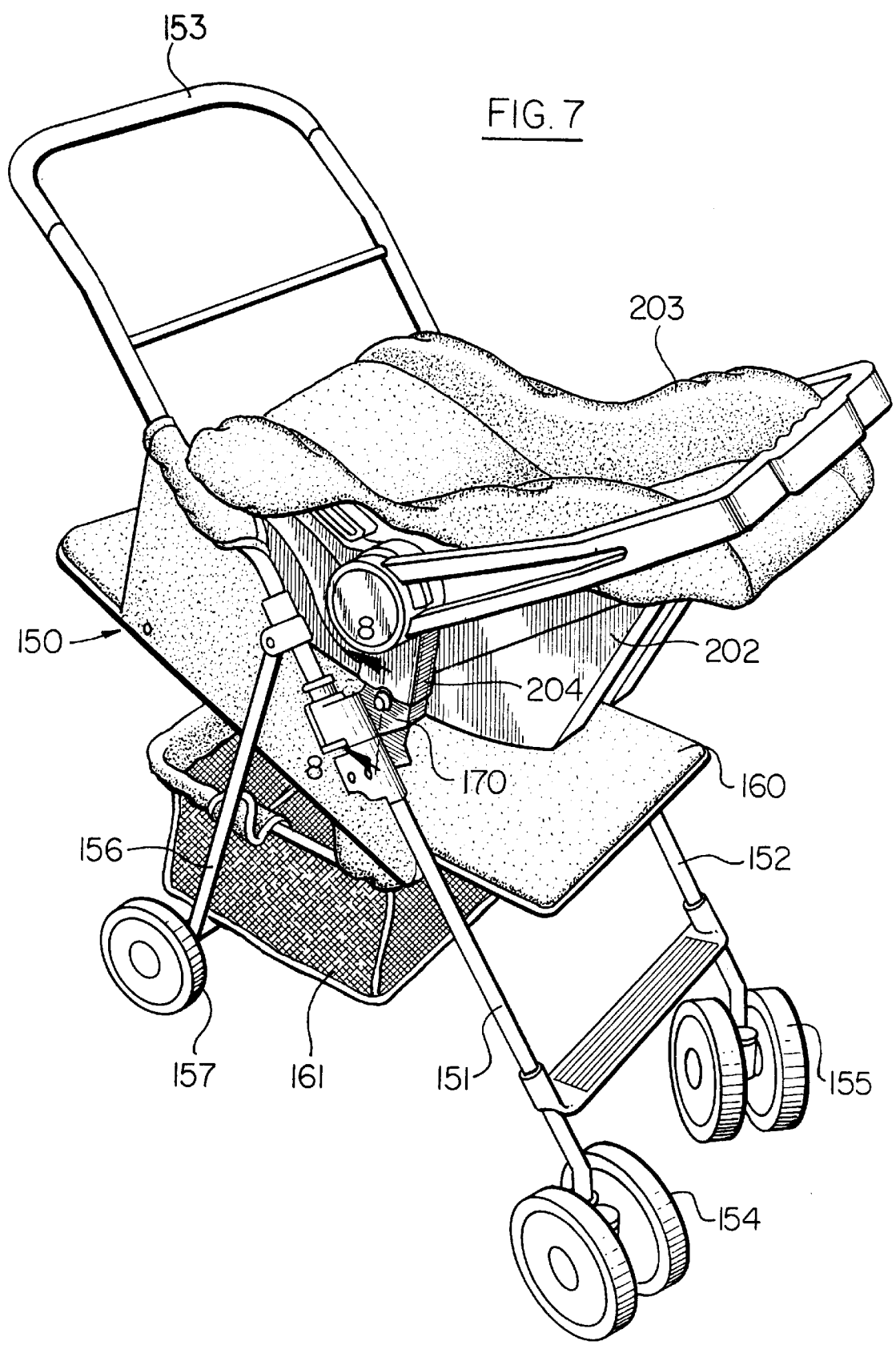
FIG. 7 shows an infant carrier of the present invention coupled to an infant stroller.
Figure 8:
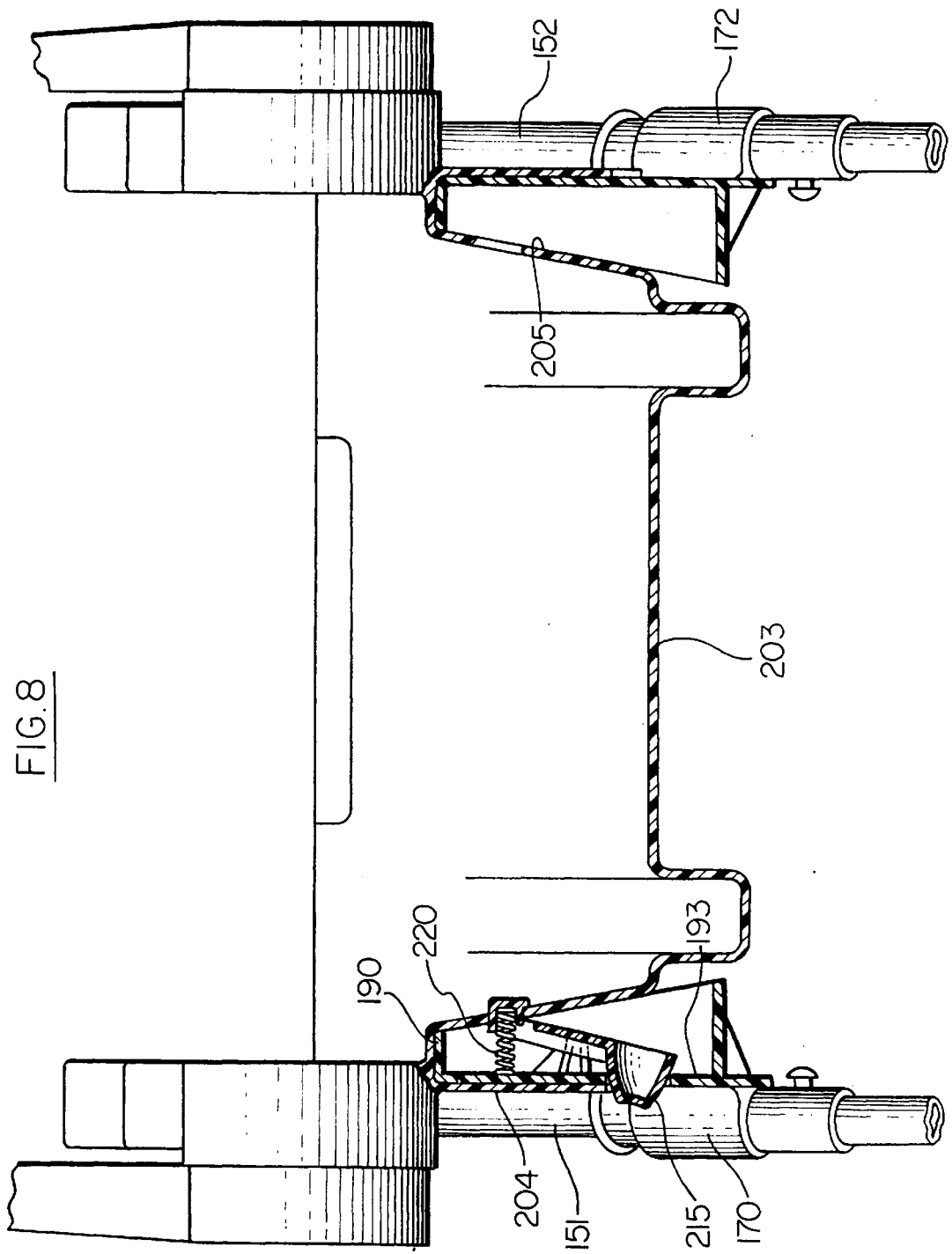
FIG. 8 shows a fragmentary, vertical, cross-section view taken along line 8—8 in FIG. 7; and, FIG. 9 shows a perspective view of a removable locking post adaptor of the present invention attached and coupled to the infant stroller shown in FIGS. 6 and 7.

When it is desired to seat carrier 202 onto stroller 150, adaptors 170, 172 are snapped on and locked to frame members 151, 152 as shown, for example, in FIGS. 6 and 8. Carrier 202, having coupling members with mounting pockets 204, 205 are disposed above mounting posts 190 as seen in FIG. 6. Carrier 202 is seated on the stroller with mounting pockets 204, 205 disposed over the post portions 190 of mounting adaptors 170, 172, as seen in FIG. 7. The mounting pockets and posts are as described previously with respect to the carrier coupling system of FIGS. 1–5.

If desired, one or both adaptors 170, 172 may include a biased lock assembly 210 whereby a mounting post is locked positively in a mounting pocket. Referring to FIG. 9, there is shown a locking assembly which includes two spaced brackets 211, 212. An elongated button member 213 comprises a recessed portion 214 at one end thereof and a button 215 at the opposite ends. Arms 216, 217 extend laterally from approximately the center of member 213. Arm 216 seats in bracket 211 while arm 217 seats in bracket 212. Brackets 218 and 219 extend over arms 216, 217 respectively to retain the button member within mounting post portion 190. One end of compression spring 220 seats on a stub, not shown, extending out from base 193 while the remaining end of spring 220 seats in recessed portion 214, the spring serving to bias button 215 whereby the button extends partially through opening 221.

Referring to FIG. 6, the lower edge of mounting pocket 204 is notched at 221. Upon seating of carrier 202 upon stroller 150, mounting pocket 204 compresses against biased button 215 at notch 221 which further serves to retain a mounting post within a carrier pocket. If desired, the mounting pocket can include an opening into which button 215 extends thereby locking the mounting post in the carrier pocket. While one locking assembly has been illustrated for the embodiment of FIGS. 6–9, it is appreciated each mounting post adaptor may include a lock assembly 210.

In one embodiment of the invention where the carrier is adapted to be utilized with an infant car seat base as well as a stroller, the mounting posts are approximately 4 inches high, 2 inches wide and taper in depth from 1 inch at the top of the post to about 1½ inches at the bottom of the mounting posts. The carrier mounting pocket is sized in taper and dimension to receive the post so that a snug fit exists when a post is disposed within a mounting pocket.

The mounting system of the present invention is relatively efficient in that an infant carrier can be mounted to a car seat base, stroller or other carrier support device simply by orienting the mounting pockets over the posts and dropping or placing the carrier onto the posts. If desired, as in the instance of a car seat base, an additional locking assembly may also be utilized whereby a pair of longitudinally spaced fingers can be releasably secured to latch members located longitudinally along the lower surface of the carrier.

Additionally, button assemblies may be utilized to releasably lock a mounting post within a mounting pocket.

While the present invention has been described in connection with a single embodiment, it will be understood to those skilled in the art that many changes and modifications may be made without departing from the true spirit and scope of the invention. It is therefore intended by the appended claims to cover all such changes and modifications which come within the true spirit and scope of the invention.

What is claimed is:

1. A system for releasably mounting an infant carrier to a separate infant carrier support device disposed below the carrier, the system comprising:

a carrier which includes a head end, foot end and a pair of spaced sides connecting said ends;

a coupling member extending outward from and for a portion of the length of each side of said carrier, said member being integrally formed in said carrier and sized and configured to form a discrete pocket located substantially centrally of said carrier sides; and, said second support device including a pair of spaced mounting posts extending upward from said second device, each post having a length, width, and depth and sized and configured to be received within a pocket in said carrier coupling member, each pocket comprising means for receiving a post and having an open end through which said post is inserted into said pocket;

said post and pocket being dimensioned and configured so that said post substantially fills said pocket to provide a snug fit;

said pocket open end having an area substantially corresponding to the cross-sectional area of the pocket adjacent said open end whereby said carrier is adapted to be coupled to said second support device solely by disposing said mounting posts into the corresponding pockets in the carrier coupling members whereby said infant carrier is coupled to the second support device and said coupling members each permit said carrier to be freely lifted vertically from said bases; and, said coupling member posts and pockets being free of any positive latching means.

2. A system for mounting an infant carrier to a second device in accordance with claim 1 in which the second device is an infant car seat base.

3. A system for mounting an infant carrier in accordance with claim 2 wherein said carrier includes at least one latch means located along the longitudinal axis of the bottom of the carrier and said base includes a biased, pivotable finger and means for releasably locking said finger to said latch means.

4. A system in accordance with claim 3 wherein said carrier includes a pair of spaced latch means located along the longitudinal axis of said carrier;

said latch means each including a biased base pivotable finger located along the longitudinal axis of said base; and, means for releasably locking said finger in said latch means.

5. A system for releasably mounting an infant carrier to a second, separate infant carrier support device disposed below the carrier, the system comprising:

a carrier which includes a head end, foot end and a pair of spaced sides connecting said ends;

a coupling member extending outward from and for a portion of the length of each side of said carrier, said member being sized and configured to form a discrete pocket located substantially centrally of said carrier sides;

said second support device including a pair of spaced mounting posts extending upward from said second device, each post having a length, width, and depth and sized and configured to be received within a pocket in said carrier coupling member, whereby said carrier can be coupled to said second support device solely by disposing said mounting posts into the corresponding pockets in the carrier coupling members whereby said infant carrier is coupled to the second support device and precluded from substantially moving longitudinally relative to said second support device;

said second device is a stroller which includes a pair of spaced frame members; and, a mounting adaptor releasably attached to each frame member, each adaptor including a post for receiving a carrier coupling member pocket.

6. A system in accordance with claim 5 wherein at least one of said mounting adaptors includes a biased locking assembly for locking at least one mounting post to a carrier coupling member when said post is seated in a coupling member pocket.

7. A system in accordance with claim 6 wherein said locking assembly includes a spring biased button means.

8. An infant carrier coupled to a second support device located below said carrier;

said carrier including a head end, foot end and a pair of spaced side walls;

a coupling member extending outward from and for a portion of the length of each side wall, said member being sized and configured to form a discrete pocket located substantially centrally of said carrier sides;

a second support device adapted to be disposed below and coupled to said carrier, said second support device including a pair of spaced mounting posts extending vertically upward from said second device; and, each of said posts having a length, width, and depth and being sized and configured to be received within a carrier coupling member pocket, each pocket comprising means for receiving a post and having an open end through which said post is inserted into said pocket, said post and pocket being dimensioned and configured so that said post substantially fills said pocket to provide a snug fit;

said pocket open end having an area substantially corresponding to the cross-sectional area of the pocket adjacent said open end; and, said coupling member posts and pockets being free of any positive latching means.

9. The infant carrier device and second support device of claim 8 wherein said carrier includes a pair of spaced latch members located along the longitudinal axis of said carrier and extending outward from the bottom surface of said carrier, each latch member having an opening therein; and, said second support device comprising an infant car seat base and including a pair of spaced, releasable biased fingers located along the longitudinal axis of said base, each finger being adapted to be received within an opening in one of said latch members;

whereby said posts and releasable fingers and latch members releasably couple said carrier to said base.

10. An infant carrier coupled to a second support device located below said carrier;

said carrier including a head end, foot end and a pair of spaced side walls;

a coupling member extending outward from and for a portion of the length of each side wall, said member being sized and configured to form a discrete pocket located substantially centrally of said carrier sides;

a second support device adapted to be disposed below and coupled to said carrier, said second support device including a pair of spaced mounting posts extending vertically upward from said second device; and, each of said posts having a length, width, and depth and being sized and configured to be received within a carrier coupling member pocket whereby said carrier is precluded from any substantial movement relative to said second support device alone the longitudinal axis;

said second support device comprises a stroller having a pair of spaced frame member;

a mounting adaptor releasably seated on each of said frame members and including said mounting post; and, said carrier coupling member pocket being adapted to be received on said post.

11. A system for releasably mounting an infant carrier to a second separate support device, the system comprising:

a carrier which includes a head end, foot end, and a pair of spaced sides connecting said ends, a first coupling member located at each carrier side substantially centrally of said side;

said second support device including a pair of second coupling members, each of said second members being adapted to couple with a first second coupling members preclude substantial movement of said carrier relative to said second device when said carrier and second support device are coupled;

one pair of said coupling members each being sized and configured to form a discrete pocket;

said remaining pair of coupling member each comprising a mounting post having a length, width and depth and sized and configured to be received within said coupling member pocket;

said posts and said pockets being dimensioned and configured so that each post substantially fills a pocket to provide a snug fit between the post and pocket; and, said coupling member posts and pockets being free of any positive latching means.

12. A system in accordance with claim 11 wherein said coupling members in said carrier each comprise one of said pockets and said coupling members on said second support device each comprise one of said posts.

13. A system for mounting an infant carrier to a second device in accordance with claim 11 in which the second device is an infant car seat base.

* * * * *

UNITED STATES PATENT AND TRADEMARK OFFICE
CERTIFICATE OF CORRECTION

PATENT NO. : 5,772,279
DATED : June 30, 1998
INVENTOR(S) : Edward M. Johnson, Jr.

It is certified that error appears in the above-identified patent and that said Letters Patent is hereby corrected as shown below:

Column 2, line 6, delete "long" and insert --along-- therefor;

Column 8, line 19, delete "alone" and insert --along-- therefor;

Column 8, line 21, delete "member" and insert --members-- therefor;

Column 8, line 35, delete "second";

Column 8, line 35, delete "members" and insert --member-- therefor; and

Column 8, line 36, before "preclude" insert --whereby said first and second coupling members --.

Signed and Sealed this

Twenty-fourth Day of November, 1998

Attest:

BRUCE LEHMAN

Attesting Officer

Commissioner of Patents and Trademarks